(12) United States Patent
Baum et al.

(10) Patent No.: US 10,173,681 B2
(45) Date of Patent: Jan. 8, 2019

(54) METHOD AND DEVICE FOR AUTOMATICALLY REGULATING VEHICLE LONGITUDINAL DYNAMICS

(71) Applicant: WABCO GmbH, Hannover (DE)

(72) Inventors: Mathias Baum, Hannover (DE);
Karsten Breuer, Lauenau (DE);
Stephan Kallenbach, Hannover (DE)

(73) Assignee: WABCO GMBH, Hannover (DE)

( * ) Notice: Subject to any disclaimer, the term of this patent is extended or adjusted under 35 U.S.C. 154(b) by 158 days.

(21) Appl. No.: 14/902,164

(22) PCT Filed: Jun. 4, 2014

(86) PCT No.: PCT/EP2014/001517
§ 371 (c)(1),
(2) Date: Dec. 30, 2015

(87) PCT Pub. No.: WO2015/003767
PCT Pub. Date: Jan. 15, 2015

(65) Prior Publication Data
US 2016/0280225 A1    Sep. 29, 2016

(30) Foreign Application Priority Data

Jul. 12, 2013 (DE) .................... 10 2013 011 623.6

(51) Int. Cl.
*B60W 30/16* (2012.01)
*B60W 30/18* (2012.01)
(Continued)

(52) U.S. Cl.
CPC ............ *B60W 30/18* (2013.01); *B60W 10/06* (2013.01); *B60W 10/18* (2013.01);
(Continued)

(58) Field of Classification Search
CPC ............... B60W 30/14; B60W 30/143; B60W 30/146; B60W 30/16; B60W 30/162
See application file for complete search history.

(56) References Cited

U.S. PATENT DOCUMENTS 6,719,076 B1    4/2004   Tabata et al.
2001/0032048 A1* 10/2001   Hellmann .......... B60K 31/0008
                                                  701/96
(Continued)

FOREIGN PATENT DOCUMENTS

DE       42 09 060 A1    9/1993
DE       196 54 769 A1   7/1998
(Continued)

*Primary Examiner* — Imran K Mustafa
(74) *Attorney, Agent, or Firm* — Leydig, Voit & Mayer, Ltd.

(57) ABSTRACT

Automatically regulating vehicle longitudinal dynamics in accordance with a preceding vehicle includes determining a first state variable dependent on vehicle acceleration, a second state variable dependent on engine drive torque, a third state variable dependent on the operating state of at least one permanent brake, and information about the preceding vehicle, and adjusting at least one regulating parameter of a regulation function and regulating the longitudinal dynamics depending on the at least one regulating parameter. A first sensor determines the vehicle speed, a second determines the drive torque, a third determines the operating state of the at least one permanent brake, a fourth determines information about the preceding vehicle and an analysis/adjustment/regulating unit analyzes the speed, the drive torque, the operating state of the at least one permanent brake and the information about the preceding vehicle, adjusting the at least one regulating parameter and regulating the vehicle longitudinal dynamics depending on the at least one regulating parameter.

19 Claims, 4 Drawing Sheets

(51) Int. Cl.
  *B60W 10/06* (2006.01)
  *B60W 10/184* (2012.01)
  *B60W 10/196* (2012.01)
  *B60W 40/076* (2012.01)
  *B60W 10/18* (2012.01)
  *G05D 1/00* (2006.01)

(52) U.S. Cl.
  CPC ........ *B60W 10/184* (2013.01); *B60W 10/196* (2013.01); *B60W 30/16* (2013.01); *B60W 40/076* (2013.01); *G05D 1/0088* (2013.01); *B60W 2510/0657* (2013.01); *B60W 2510/182* (2013.01); *B60W 2520/105* (2013.01); *B60W 2550/142* (2013.01); *B60W 2550/302* (2013.01); *B60W 2550/308* (2013.01); *B60W 2720/106* (2013.01)

(56) References Cited

U.S. PATENT DOCUMENTS

2001/0039472 A1* 11/2001 Isogai ............... B60K 31/0008
  701/96
2011/0276216 A1* 11/2011 Vaughan ............... B60W 10/06
  701/31.4
2012/0065863 A1   3/2012 Takagi et al.
2015/0120159 A1*  4/2015 O'Leary ................ B60T 7/04
  701/70

FOREIGN PATENT DOCUMENTS

| | | |
|---|---|---|
| DE | 10 2010 055 373 | 6/2012 |
| EP | 1 053 903 A2 | 11/2000 |
| JP | 2000306200 A | 11/2000 |
| JP | 2001328453 A | 11/2001 |
| JP | 2001328454 A | 11/2001 |
| JP | 2003335147 A | 11/2003 |
| JP | 2004268846 A | 9/2004 |
| JP | 3680734 B2 | 8/2005 |
| JP | 2006347507 A | 12/2006 |
| KR | 20120118776 A | 10/2012 |
| WO | WO 2012/158097 A1 | 11/2012 |

* cited by examiner

METHOD AND DEVICE FOR AUTOMATICALLY REGULATING VEHICLE LONGITUDINAL DYNAMICS

FIELD OF THE INVENTION

The present invention generally concerns a method for automatically regulating the longitudinal dynamics of a motor vehicle.

BACKGROUND OF THE INVENTION

Utility vehicles use distance or speed regulating systems that adjust the speed value or acceleration value depending on the vehicle traveling ahead. Such regulating systems are also referred to as adaptive cruise controllers or automatic distance regulators (ADR), wherein the expression Adaptive Cruise Control (ACC) has become established for such regulation.

Adaptive distance or speed regulating systems are able to intervene in the brake system and/or the engine management, so that by accelerating and/or braking the vehicle, a desired target distance to the vehicle ahead can be automatically controlled. General driving safety is thus increased by maintaining an adequate distance to the vehicle ahead, and the brake wear and, hence, also the vehicle down time, are reduced.

Such regulating systems are particularly advantageous if monotonous driving maneuvers have to be carried out over a long period of time, which can result in fatigue and, hence, a reduced response capability of the vehicle driver. Monotonous and tiring driving maneuvers are frequently carried out on transport journeys with utility vehicles or when driving urban buses or tour buses.

DE 10 2010 055 373 A1 discloses a method for regulating the longitudinal dynamics of a motor vehicle according to a conventional adaptive distance regulation or speed regulation system.

The longitudinal dynamic behavior of an ACC regulated motor vehicle is highly dependent on ambient influences, such as, for example, the gradient of the road or the wind conditions. It can thus be observed with the known regulating systems that, when following another vehicle on level terrain, a high level of ride comfort is guaranteed and the desired following distance to the vehicle ahead can be maintained in a satisfactory manner.

However, if while driving downhill the vehicle experiences an additional acceleration that is not dependent on the drive torque of the engine as a result of the gradient of the road, the regulation of the high level of ride comfort can no longer be maintained and/or the distance to the vehicle ahead frequently falls well below the adjusted or desired distance. The result of falling below the desired following distance is a sudden strong braking intervention by the regulating system, or the driver feels it necessary to make a braking intervention owing to subjective perception, whereby comfort is reduced further.

Consequently, known systems can also be adjusted such that a high level of ride comfort is guaranteed while driving on a gradient; but this cannot be maintained while driving on level ground. Adaptive distance or speed regulation that can be implemented from an economic standpoint and that guarantees a high level of comfort and sufficient following distances both while driving on level ground and also while driving downhill is therefore needed.

SUMMARY OF THE INVENTION

Generally speaking, it is an object of the present invention to provide a method and a device that detect the presence of ambient influences that affect the regulation and that adapt the regulation to the ambient influences to achieve a high level of comfort and sufficient following distances when following another vehicle regardless of the ambient influences.

According to an embodiment of a method according to the present invention, a first state variable dependent on the acceleration of the vehicle, a second state variable dependent on the drive torque of the engine, a third state variable dependent on the operating state of at least one permanent brake, and information about the vehicle ahead are determined, and at least one regulating parameter of the regulation function is adjusted and the longitudinal dynamics of the vehicle are regulated depending on the at least one regulating parameter. That is, the adjustment of the at least one regulating parameter of the regulation function is carried out depending on the first, second and third state variables and the determined information about the vehicle ahead.

Depending on the acceleration of the vehicle, on the drive torque of the engine and on the operating state of at least one permanent brake, it can be determined whether ambient influences are acting on the vehicle that result in an additional acceleration of the vehicle, such as for example an inclined road while driving downhill. If a positive acceleration of the vehicle is determined while there is no or only a low drive torque of the engine and the operating state of the permanent brake or the permanent brakes enables a high load to be concluded, then external influences are acting on the vehicle, resulting in an acceleration of the vehicle that is not caused by the drive train. With the information about the vehicle ahead, it can further be determined whether the distance to the vehicle ahead must be increased or reduced in order to achieve the set target distance to the vehicle ahead. If external influences are acting on the vehicle that result in an acceleration of the vehicle, and at the same time it is determined from the information about the vehicle ahead that the distance to the vehicle ahead must be increased, a response can be made with an adjustment or adaptation of the regulating parameter of the regulation function such that the regulating behavior is not adversely affected by the external influences on the vehicle. The longitudinal dynamics of the vehicle can thus be regulated depending on the regulating parameter that is adapted to the external influences.

The operating state of the permanent brake is for example the braking torque caused by the permanent brake. The operating state can however also be determined from the current braking power of the permanent brake. If the permanent brake is implemented as an engine brake, in particular as an engine brake with exhaust throttle or as an engine brake with exhaust throttle and constant choke, the operating state of the permanent brake can also be determined from the flap position. If flow brakes (hydrodynamic retarders) or eddy current brakes (electromagnetic retarders) are used as permanent brakes, the operating state of the permanent brake can also be determined from the revolution rate of the shaft or rotor of the retarder.

One embodiment of the method according to the present invention includes the steps of determining if the first state variable is greater than and/or less than a limit value and/or determining if the second state variable is greater than and/or less than a limit value and/or determining if the third state variable is greater than and/or less than a limit value. The adjustment of the regulating parameter of the regulation function is then carried out depending on the first, second and/or third state variable exceeding and/or being less than a limit value. In particular, it can be determined from such a case of a limit value being exceeded and/or not reached whether the vehicle exceeds an acceleration limit value that would be expected depending on the drive torque of the engine and the operating state of the permanent brake presently being greater than and/or less than a limit value.

In another embodiment, the adjustment of the regulating parameter of the regulation function is carried out depending on a logical combination of at least the first, second and/or third state variable being greater than and/or less than a limit value. This operation based on Boolean algebra enables states that can adopt a first state value and a second state value to be compared with each other. If for example a limit value is exceeded, a variable related thereto can be defined as 1, true. If a limit value is not exceeded, the variable related thereto can be defined as 0, false. By logical operators, such as AND combinations, OR combinations, NOT combinations, NOR combinations and/or NAND combinations, the presence of states in which limit values are exceeded by a plurality of state variables can be compared with each other and the regulating parameter of the regulation function can be adjusted depending thereon. For example, the adjustment of the regulating parameter of the regulation function can be carried out such that the regulating parameter adopts a constant value until states in which the first, second and third state variables exceed limit values exist. If the states in which limit values are exceeded exist at the same time, the regulating parameter is altered in a defined manner. The question of whether the first, second and third state variables are greater than their limit values at the same time can be queried with a logical AND combination of their state variables.

A further embodiment of the method according to the present invention includes the steps of determining a fourth state variable dependent on at least one wheel brake and determining when the fourth state variable is greater than and/or less than a limit value. The adjustment of the regulating parameter of the regulation function is carried out in this embodiment depending on a logical combination of at least the states in which a limit value is exceeded and/or in which a limit value is not reached by the first, second, third and/or fourth state variables. The determination of the fourth state variable depending on at least one wheel brake can include determining a brake pressure, a brake force, the acceleration of the vehicle and/or the speed of the vehicle. Alternatively, the fourth state variable can itself be the brake pressure, the brake force, the acceleration of the vehicle and/or the speed of the vehicle. The state of the wheel brake gives a further indication of whether there are ambient influences that additionally accelerate the vehicle independently of the drive torque of the engine. If there are such ambient influences, the regulating parameter of the regulation function can be adapted so that the high level of regulation comfort is maintained and the desired distances from the vehicle ahead can be guaranteed.

RADAR sensors or LIDAR systems can be used to determine information about the vehicle ahead including the speed and/or the acceleration of the vehicle ahead and/or the actual distance to the vehicle ahead. However, other sensor types based on transition time measurement also come into consideration for determining information about the vehicle ahead. The use of photonic mixer detectors (PMD sensors) or ultrasound for determining information about the vehicle ahead is also possible.

A further embodiment of the method according to the present invention includes the step of deriving information about the inclination state of the vehicle depending on the first, second and third state variables. In particular, information about the inclination state of the vehicle can also be derived depending on the first, second, third and fourth state variables. During this, based on the state variables, it can either be concluded that a certain inclination limit value of the road or of the vehicle has been exceeded or the exact current inclination value of the road and/or of the vehicle can be determined using a calculation routine.

According to another embodiment, the regulation of the longitudinal dynamics of the vehicle depending on the regulating parameter includes accelerating and/or braking the vehicle. This means that the regulation can intervene in the brake system of the vehicle and in the engine management in order to generate an additional braking torque and/or drive torque depending on the situation. The determination of the first state variable that is dependent on the acceleration of the vehicle preferably includes determining the acceleration of the vehicle; alternatively the first state variable is the acceleration of the vehicle. The determination of the second state variable that is dependent on the drive torque of the engine preferably includes determining the drive torque of the engine; alternatively the second state variable is the drive torque of the engine. The determination of the third state variable that is dependent on the operating state of at least one permanent brake preferably includes determining one or a plurality of the aforementioned variables that can be determined for permanent brakes; alternatively the third state variable is one of the aforementioned variables that can be determined for permanent brakes.

In a further embodiment, the determination of the third state variable that is dependent on the operating state of at least one permanent brake includes determining the load on the at least one permanent brake. The load can, for example, be determined as the percentage component, wherein a deactivated or inactive permanent brake is loaded at 0% and a maximally stressed permanent brake is loaded at 100%.

In another embodiment, a target distance to the vehicle ahead is defined, and the actual distance to the vehicle ahead is determined and compared with the defined target distance.

Advantageously, the regulating parameter is increased or reduced if the first, second and third state variables are greater than and/or less than limit values and the target distance to the vehicle ahead is greater than the actual distance to the vehicle ahead. The increase or reduction of the regulating parameter is independent of the amount greater than and/or less than the limit values, but increases or reduces while the first, second and third state variables are greater than and/or less than limit values.

Preferably, the regulating parameter is not greater than a maximum value and is not less than a minimum value. On reaching the maximum value or the minimum value, the regulating parameter preferably remains constant if the first, second and third state variables are greater than and/or less than limit values and the target distance to the vehicle ahead is greater than the actual distance to the vehicle ahead. Restricting the regulating parameter to a defined range of values, for example, prevents the regulation from becoming highly entrenched while continuously driving downhill because the regulating parameter that is influencing the regulation is increased to an extremely large value.

Preferably, the regulating parameter increases and/or reduces linearly, non-linearly and/or according to a defined function if the first, second and third state variables are greater than and/or less than limit values and the target distance to the vehicle ahead is greater than the actual distance to the vehicle ahead. The determination of the regulating parameter is thus not carried out depending on the amount by which the first, second or third state variable is greater than and/or less than a limit value. Rather, the regulating parameter increases according to one of the functions referred to above with the first, second and third state variables continuously greater than and/or less than limit values or decreases with the same if the target distance to the vehicle ahead is greater than the actual distance to the vehicle ahead.

In a further embodiment, the regulating parameter of the regulation function is a gain factor. A speed difference relative to the vehicle ahead is determined as is a target acceleration of the vehicle depending on the determined speed difference relative to the vehicle ahead and the set gain factor. The target acceleration is dependent for this on an increased speed difference relative to the vehicle ahead, wherein the increase of the speed difference relative to the vehicle ahead is dependent on the gain factor and/or the target acceleration is dependent on a function of the determined speed difference and on the gain factor. It can thus occur, for example, that the gain factor is constant while driving on level ground and changes when driving downhill and/or when driving uphill, preferably increasing up to a maximum value with continuous driving downhill and/or uphill. If one of the state variables is no longer greater than and/or less than a limit value, the gain factor can either be reset directly to the constant value or reduced to the same steadily or according to a function.

A further embodiment includes the step of determining the current mass of the vehicle. It is preferred to also adjust the at least one regulating parameter of the regulation function depending on the mass of the vehicle. In particular, the mass of the vehicle can have an influence on the defined limit values relative to which the state variables can be detected to be greater and/or smaller. This ensures use for regulating different types of vehicles. For example, the regulation can respond to the current load state by taking into account the mass of the vehicle.

According to another embodiment of the present invention, a device for automatically regulating the longitudinal dynamics of a motor vehicle, in particular of a utility vehicle, utilizes a first sensing device for determining the speed of the vehicle, a second sensing device for determining the drive torque of the engine, a third sensing device for determining the operating state of at least one permanent brake, a fourth sensing device for determining information about the vehicle ahead and an analysis, adjustment and regulating unit for analyzing the speed of the vehicle, the drive torque of the engine, the operating state of the at least one permanent brake and the information about the vehicle ahead, adjusting at least one regulating parameter and regulating the longitudinal dynamics of the vehicle depending on the at least one regulating parameter. The analysis, adjustment and regulating unit is therefore designed to adjust the at least one regulating parameter depending on an acceleration of the vehicle determined from the speed of the vehicle, the drive torque of the engine, the operating state of the at least one permanent brake and the information about the vehicle ahead. Besides a speed sensor, an acceleration sensor comes into consideration as the first sensing device for determining the speed of the vehicle, such as for example a piezoelectric, piezoresistive, capacitive or magnetoresistive acceleration sensor. The second sensing device can be a torque sensor based on strain gauges. Furthermore, the second sensing device can also be implemented to operate according to the piezoelectric, the magnetoelastic or the optical principle. The third sensing device for determining the operating state of at least one permanent brake can, for example, be an acceleration or speed sensor, a brake pressure sensor, a gradient sensor or a revolution rate sensor. RADAR and LIDAR systems are preferably used as the fourth sensing device.

In a further embodiment, the analysis, adjustment and regulating unit comprises a logic unit that is connected to the sensing devices and that is designed to logically combine the detected states of the acceleration of the vehicle, the drive torque of the engine, the operating state of the at least one permanent brake and the difference between the target distance to the vehicle ahead and the actual distance to the vehicle ahead being greater than and/or less than limit values with each other and to adjust the regulating parameter as a result thereof. The logic unit is preferably implemented as an electronic computer unit.

A fifth sensing device for determining the state of at least one wheel brake can be employed, wherein the analysis, adjustment and regulating unit also analyzes the state of the at least one wheel brake, the logic unit logically combines the detected state of the at least one wheel brake being greater than and/or less than limit values with the detected states of the acceleration of the vehicle, the drive torque of the engine, the operating state of the at least one permanent brake and the difference between the target distance relative to the vehicle ahead and the actual distance to the vehicle ahead being greater than and/or less than limit values and adjusts the regulating parameter as a result thereof. The fifth sensing device can, for example, be a speed or acceleration sensor, a brake pressure sensor or a torque sensor.

Still other objects and advantages of the present invention will in part be obvious and will in part be apparent from the specification.

The present invention accordingly comprises the features of construction, combination of elements, and arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is described in greater detail below with reference to the accompanying drawing figures, in which.

REFERENCE CHARACTER LIST

1 motor vehicle
2 vehicle ahead
3 device for regulating the longitudinal dynamics of the vehicle
4a, 4b, 4c, 4d wheel brakes
6 engine
8 permanent brake
14 first sensing device 16 second sensing device
18 third sensing device
20 fourth sensing device
22 fifth sensing device
24 analysis, adjustment and regulating unit
26 logic unit
100 defining a target distance to the vehicle ahead
102 determining a first state variable dependent on the acceleration of the vehicle
104 determining a second state variable dependent on the drive torque of the engine
106 determining a third state variable dependent on the operating state of at least one permanent brake
108 determining information about a vehicle ahead
109 determining the actual distance to the vehicle ahead
110 comparing the determined actual distance to the vehicle ahead with the defined target distance to the vehicle ahead
112 determining if the first state variable exceeds a limit value and/or is less than a limit value
114 determining if the second state variable exceeds a limit value and/or is less than a limit value
116 determining if the third state variable exceeds a limit value and/or is less than a limit value
120 adjustment of the at least one regulating parameter of the regulation function depending on a logical combination
122 deriving information about the inclination state of the vehicle depending on the first, second and third state variables
128 adjustment of at least one regulating parameter of the regulation function
130 determining a speed difference relative to the vehicle ahead
132 determining a target acceleration of the vehicle depending on the determined speed difference relative to the vehicle ahead and the set gain factor
134 regulating the longitudinal dynamics of the vehicle depending on the at least one regulating parameter
201 speed of the vehicle
202 acceleration of the vehicle
204 speed of the vehicle ahead
206 acceleration of the vehicle ahead
208 target distance to the vehicle ahead
210 actual distance to the vehicle ahead
212 slope angle of the road
300 regulating parameter
302 maximum value of the regulating parameter
310 first state variable
312 limit value of the first state variable
320 second state variable
322 limit value of the second state variable
330 third state variable
332 limit value of the third state variable
340 difference between the target distance to the vehicle ahead and the actual distance to the vehicle ahead
342 limit value of the difference between the target distance to the vehicle ahead and the actual distance to the vehicle ahead
350 time
351-358 points in time

DETAILED DESCRIPTION OF THE PREFERRED EMBODIMENTS

Figure 1:
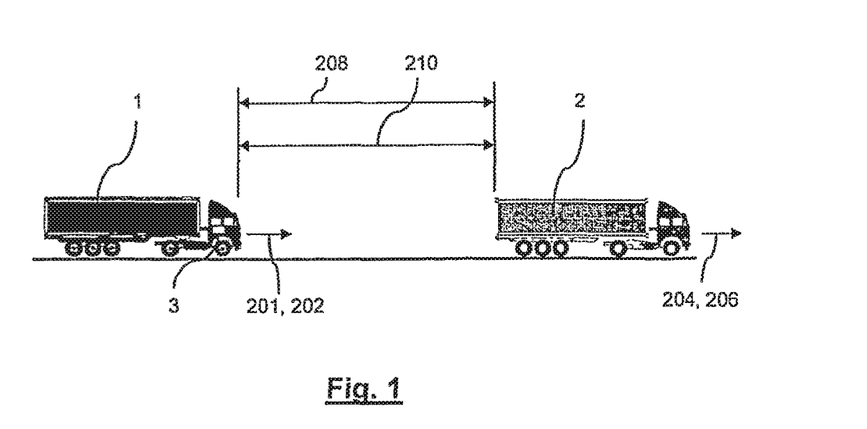
FIG. 1 shows a longitudinally dynamically regulated vehicle traveling behind a vehicle ahead on level ground in accordance with an embodiment of the present invention.

FIG. 1 shows a longitudinally dynamically regulated motor vehicle 1 traveling behind a vehicle ahead 2 on level terrain. The motor vehicle 1 is moving with a speed 201 and an acceleration 202 behind the vehicle ahead 2, which is moving with a speed 204 and an acceleration 206. The motor vehicle 1 comprises a device 3 for regulating the longitudinal dynamics of the vehicle 1, which can accelerate and decelerate the vehicle 1 depending on the determined acceleration of the vehicle, the drive torque of the engine, the operating state of the permanent brake and the information about the vehicle ahead 2. During the illustrated travel on level ground, there are no ambient influences acting on the vehicle 1 that would necessitate adaptation of the regulation that is matched to level travel. The regulation is configured to guarantee a high degree of regulation comfort while traveling on level ground and, at the same time, to maintain the desired target distance 208 to the vehicle ahead 2 with a satisfactory tolerance, so that the actual distance 210 to the vehicle ahead 2 essentially corresponds to the set target distance 208 to the vehicle ahead 2.

Figure 2:
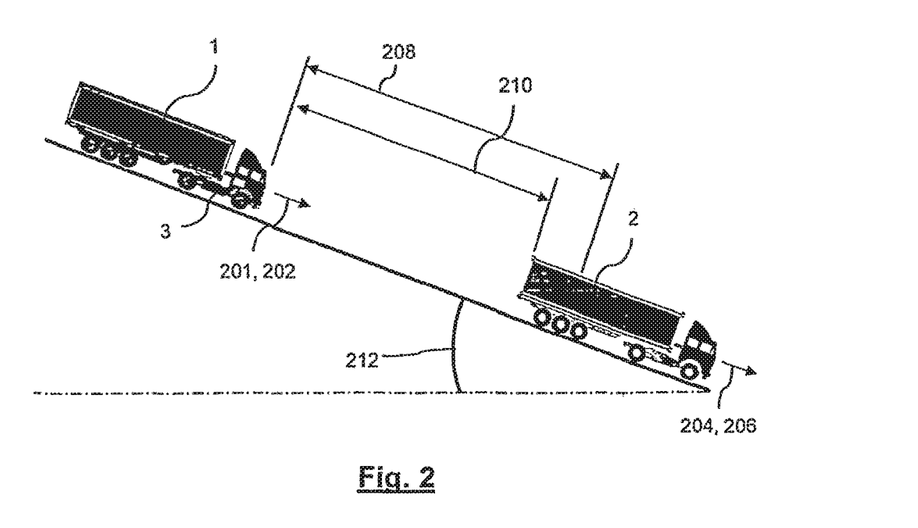
FIG. 2 shows a longitudinally dynamically regulated vehicle traveling behind a vehicle ahead on an incline in accordance with an embodiment of the present invention.

As a result of the downhill travel of the vehicle 1 illustrated in FIG. 2 on a road sloping at the angle 212, an additional acceleration of the vehicle 1 occurs that is not caused by the drive torque of the engine. The acceleration 202 and the speed 201 of the vehicle 1 are consequently increased. If the speed 204 and/or the acceleration 206 of the vehicle ahead 2 remain(s) constant, the set target distance 208 to the vehicle ahead 2 will no longer be maintained. Consequently, the actual distance 210 to the vehicle ahead 2 is less than the set target distance 208 to the vehicle ahead 2. If, at the same time, it is determined that the acceleration 202 of the vehicle and the operating state of at least one permanent brake are greater than limit values, it is necessary to adapt the regulation to the ambient influences. This is carried out by adjusting a regulating parameter depending on the acceleration 202 of the vehicle, the drive torque of the engine, the operating state of the least one permanent brake and the information about the vehicle ahead 2.

Figure 3:
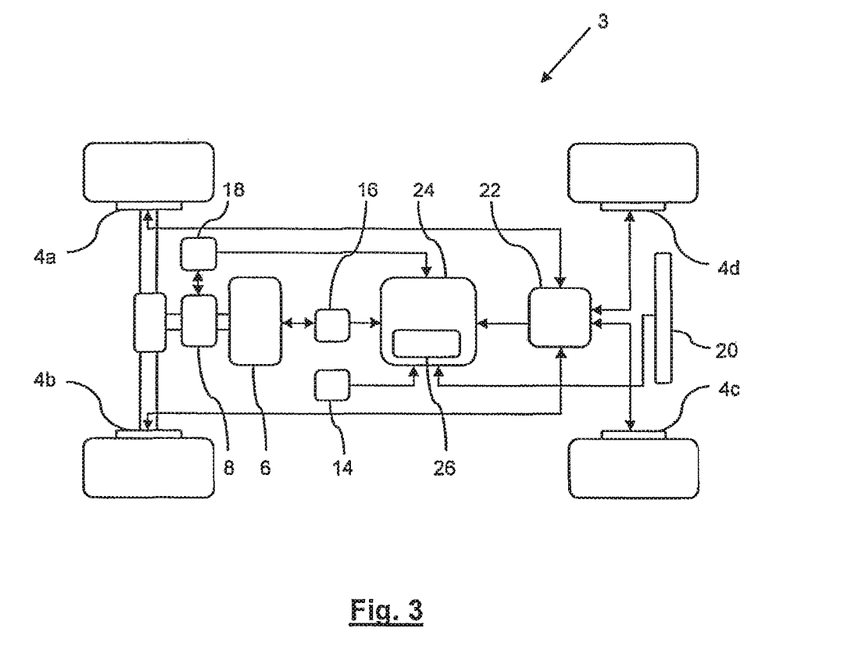
FIG. 3 is a schematic representation of an embodiment of the device according to the present invention.

According to FIG. 3, the device for regulating the longitudinal dynamics of the vehicle 3 comprises a first sensing device 14 for determining the speed of the vehicle, a second sensing device 16 for determining the drive torque of the engine 6, a third sensing device 18 for determining the operating state of a permanent brake 8, a fourth sensing device 20 for determining information about a vehicle ahead, a fifth sensing device 22 for determining the state of the four wheel brakes 4a, 4b, 4c, 4d and an analysis, adjustment and regulating unit 24 for analyzing the data determined by the sensing devices 14, 16, 18, 20, 22, adjusting at least one regulating parameter and regulating the longitudinal dynamics of the vehicle depending on the adjusted regulating parameter.

The analysis, adjustment and regulating unit 24 is designed to adjust the regulating parameter depending on an acceleration of the vehicle determined from the speed of the vehicle, the drive torque of the engine 6, the operating state of the permanent brake 8, the state of the four wheel brakes 4a, 4b, 4c, 4d and the information about the vehicle ahead. The analysis, adjustment and regulating unit 24 further comprises a logic unit 26 that logically combines states of the acceleration of the vehicle, the drive torque of the engine 6, the operating state of the permanent brake 8, the state of the four wheel brakes 4a, 4b, 4c, 4d and the difference between the target distance to the vehicle ahead and the actual distance to the vehicle ahead being greater than limit values and adjusts the regulating parameter as a result thereof.

Figure 4:
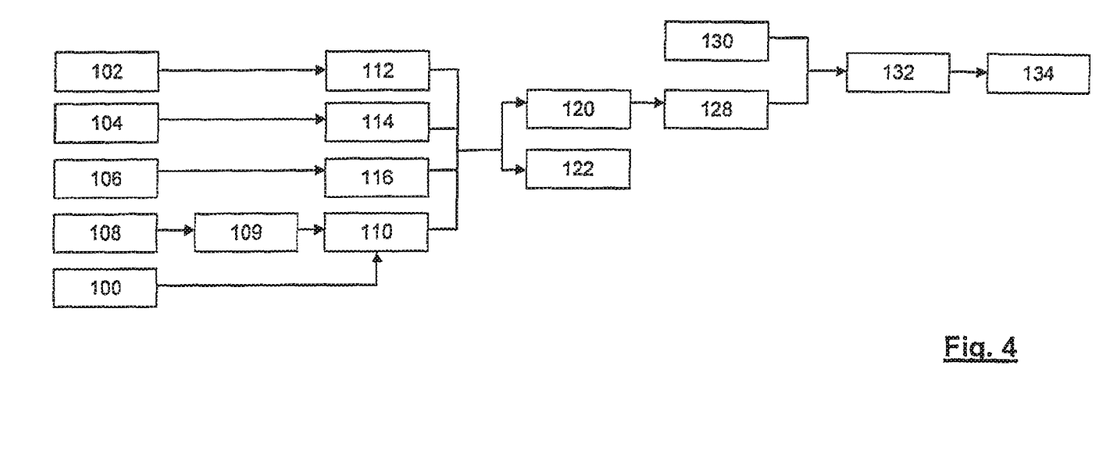
FIG. 4 is a flow chart illustrating an embodiment of a method for automatically regulating the longitudinal dynamics of a motor vehicle according to the present invention.

FIG. 4 is a flow chart illustrating a method for automatically regulating the longitudinal dynamics of a motor vehicle. The method comprises the steps of determining a first state variable 102 that is dependent on the acceleration of the vehicle, determining a second state variable 104 that is dependent on the drive torque of the engine, determining a third state variable 106 that is dependent on the operating state of at least one permanent brake and determining information about a vehicle ahead 108. Based on the determined information about the vehicle ahead, the actual distance to the vehicle ahead is determined (step: determining the actual distance to the vehicle ahead 109). A target distance to the vehicle ahead that is defined by the step of defining a target distance to the vehicle ahead 100 is compared in the step for comparing the determined actual distance to the vehicle ahead with the defined target distance to the vehicle ahead 110. The method further comprises the steps for determining when the first state variable 112 is greater than a limit value, determining when the second state variable 114 is greater than a limit value and determining when the third state variable 116 is greater than a limit value.

Based on the first, second and third state variables exceeding limit values and the comparison of the determined actual distance to the vehicle ahead with the defined target distance to the vehicle ahead, the adjustment of the at least one regulating parameter of the regulation function 128 can be carried out by means of a logical combination 120. Moreover, the derivation of information about the inclination state of the vehicle depending on the first, second and third state variable 122 is possible. The regulating parameter is a gain factor in the illustrated method. Following the step of determining a speed difference relative to the vehicle ahead 130, the step of determining a target acceleration of the vehicle depending on the determined speed difference relative to the vehicle ahead and the set gain factor 132 can be carried out. After the target acceleration of the vehicle is determined, the step of regulating the longitudinal dynamics of the vehicle depending on the regulating parameter (gain factor) can be carried out. The regulation of the longitudinal dynamics of the motor vehicle can thus be adapted to the ambient influences acting on the motor vehicle based on the described method, so that, for example, while traveling on a gradient a similar level of regulation comfort or ride comfort can be guaranteed as when traveling on level ground, and moreover the defined target distance to the vehicle ahead can be maintained in a satisfactory manner.

Figure 5:
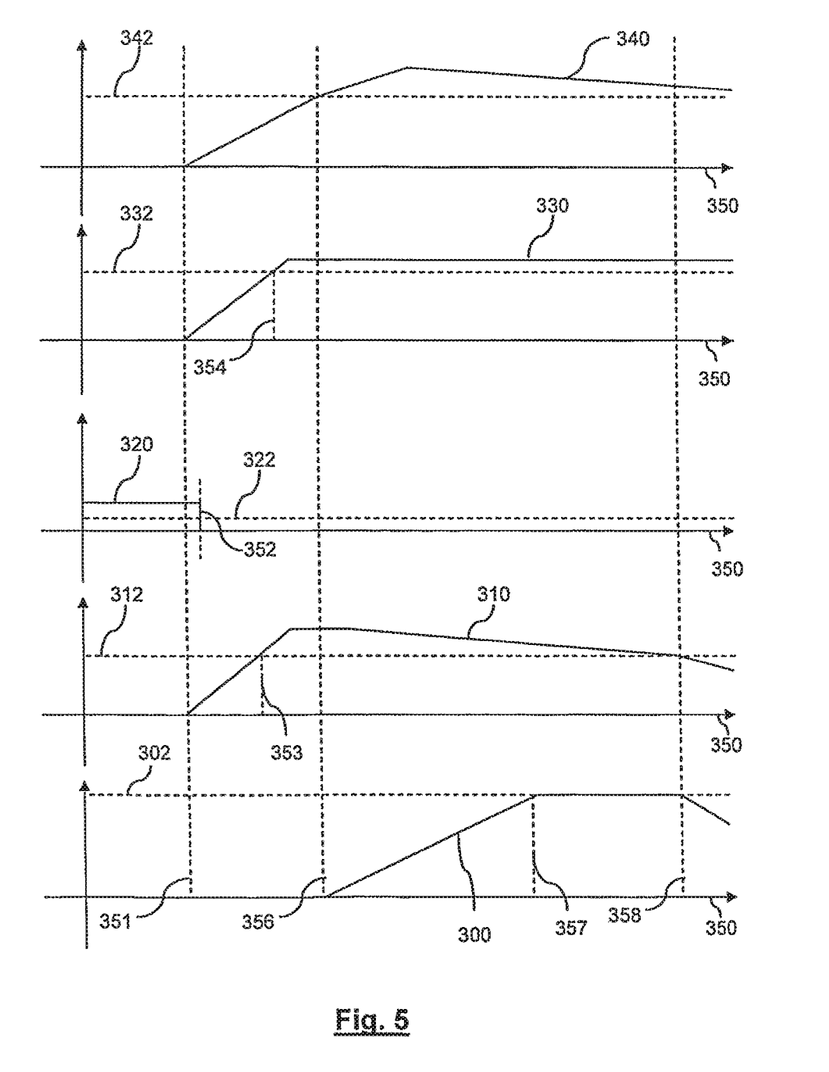
FIG. 5 is a schematic representation of state variable changes and regulation parameter changes plotted against time.

FIG. 5 shows the changes of the regulating parameter 300, the first state variable 310 that is dependent on the acceleration of the vehicle, the second state variable 320 that is dependent on the drive torque of the engine, the third state variable 330 that is dependent on the operating state of the permanent brake and the difference 340 between the target distance to the vehicle ahead and the actual distance to the vehicle ahead plotted against time 350. In the illustrated driving situation, the vehicle to be regulated is traveling on a sloping road at the point in time 351. At the point in time 352, the drive torque of the engine reduces to zero, so that the second state variable 320 also decreases to zero. The decrease of the second state variable results in the same being less than a limit value of the second state variable 322. Because of the sloping road, the vehicle experiences an additional acceleration that is not dependent on the drive torque of the engine. Despite the lack of engine torque, the acceleration increases up to a limit value, so that the first state variable 310 also increases up to a maximum value. During the increase of the first state variable 310, at the point in time 353, a limit value of the first state variable 312 is exceeded. Because of the increasing acceleration, the permanent brake of the vehicle has also been activated. The third state variable 330 in the exemplary embodiment shown is the percentage load on the permanent brake. At the point in time 354, the third state variable 330 exceeds a limit value of the third state variable 332, which can lie for example at 90% of the maximum load of the permanent brake. The difference 340 between the target distance to the vehicle ahead and the actual distance to the vehicle ahead increases from traveling on the uphill stretch at the point in time 351. At the point in time 356, a limit value 342 of the difference 340 between the target distance to the vehicle ahead and the actual distance to the vehicle ahead is exceeded. At the point in time 356, there are consequently simultaneous states of the first state variable 310, the third state variable 330 and the difference 340 between the target distance to the vehicle ahead and the actual distance to the vehicle ahead exceeding limit values and a state of the second state variable being less than a limit value. Because of the presence of these states of limit values being exceeded and the state of the second state variable being less than a limit value, the regulating parameter 300 rises steadily or increases starting from the point in time 356 until the regulating parameter 300 reaches a maximum value 302 at the point in time 357. The regulating parameter 300 remains constant after once reaching the maximum value 302 until one of the described states of a limit value being exceeded or the described state of the second state variable being less than a limit value no longer exists. In the illustrated driving situation, at the point in time 358 the first state variable 310 falls below the limit value of the first state variable 312. Because one of the prerequisites to increase or to maintain constant the regulating parameter 300 no longer exists, the regulating parameter 300 reduces from the point in time 358.

The representation in FIG. 5 is a schematic representation for explaining the regulation method according to the invention. It should be appreciated that the illustrated profiles of the state variables 310, 320, 330 and the profile of the difference 340 between the target distance to the vehicle ahead and the actual distance to the vehicle ahead are highly simplified and do not take into account the entirety of all interactions of the variables with each other.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for automatically regulating longitudinal dynamics of a motor vehicle, the method comprising:
  using at least one sensing device:
   i. determining a first state variable that is dependent on acceleration of the vehicle;
   ii. determining a second state variable that is dependent on engine drive torque of the vehicle;
   iii. determining a third state variable that is dependent on an operating state of at least one permanent brake of the vehicle; and
   iv. determining information about a vehicle traveling ahead of the vehicle;

using at least one control unit:
adjusting at least one regulating parameter of a regulation function of the vehicle based at least in part on the first, second and third state variables and the information about the vehicle traveling ahead; and
regulating the longitudinal dynamics of the vehicle based at least in part on the at least one regulating parameter.

2. The method as claimed in claim 1, further comprising:
determining whether the first state variable is greater than or less than a first limit value;
determining whether the second state variable is greater than or less than a second limit value; and
determining whether the third state variable is greater than or less than a third limit value;
wherein adjusting the at least one regulating parameter of the regulation function is effected based at least in part on the first, second and/or third state variables being greater than or less than the respective first, second and/or third limit values.

3. The method as claimed in claim 2, wherein adjusting the at least one regulating parameter of the regulation function is effected based at least in part on a logical combination of at least the first, second and third state variables being greater than or less than the respective first, second and/or third limit values.

4. The method as claimed in claim 3, further comprising:
determining a fourth state variable that is dependent on at least one wheel brake of the vehicle; and
determining whether the fourth state variable is greater than or less than a fourth limit value;
wherein adjusting the at least one regulating parameter of the regulation function is effected based at least in part on logical combination of at least the first, second, third and fourth state variables being greater than or less than the respective first, second, third and fourth limit values.

5. The method as claimed in claim 1, wherein determining information about the vehicle ahead includes determining speed and/or acceleration of the vehicle ahead and/or determining actual distance between the vehicle and the vehicle ahead.

6. The method as claimed in claim 1, further comprising determining information about an inclination state of the vehicle based at least in part on the first, second and third state variables.

7. The method as claimed in claim 1, wherein determining the third state variable includes determining a load of the at least one permanent brake.

8. The method as claimed in claim 2, further comprising increasing or decreasing the at least one regulating parameter based on the first, second and third state variables being greater than or less than the respective first, second and third limit values and a target distance from the vehicle to the vehicle ahead being greater than an actual distance from the vehicle to the vehicle ahead.

9. The method as claimed in claim 8, wherein the at least one regulating parameter does not exceed a maximum value and does not fall below a minimum value based on the first, second and third state variables being greater than or less than the respective first, second and third limit values and the target distance to the vehicle ahead being greater than the actual distance to the vehicle ahead.

10. The method as claimed in claim 8, wherein the at least one regulating parameter increases and/or decreases linearly, non-linearly, and/or according to a defined function based on the first, second, and third state variables being greater than or less than the respective first, second, and third limit values and the target distance to the vehicle ahead being greater than the actual distance to the vehicle ahead.

11. The method as claimed in claim 1, wherein the at least one regulating parameter is a gain factor, the method further comprising:
determining a speed difference relative to the vehicle ahead; and
determining a target acceleration of the vehicle based on the speed difference and the gain factor;
wherein the target acceleration is dependent on an increased speed difference relative to the vehicle ahead and the increased speed difference is dependent on the gain factor and/or the target acceleration is a function of the speed difference and of the gain factor.

12. A device for regulating longitudinal dynamics of a motor vehicle, the device comprising:
a first sensing device configured to determine a speed of the vehicle;
a second sensing device configured to determine a drive torque of an engine of the vehicle;
a third sensing device configured to determine an operating state of at least one permanent brake of the vehicle;
a fourth sensing device configured to determine information about a vehicle traveling ahead of the vehicle; and
a control unit configured to:
(i) analyze the speed of the vehicle, the drive torque of the engine of the vehicle, the operating state of the at least one permanent brake, and the information about the vehicle ahead,
(ii) adjust at least one regulating parameter based on an acceleration of the vehicle determined from the speed of the vehicle, the drive torque, the operating state of the at least one permanent brake and the information about the vehicle ahead, and
(iii) regulate longitudinal dynamics of the vehicle based at least in part on the at least one regulating parameter.

13. The device as claimed in claim 12, wherein the control unit comprises a logic unit configured to logically combine states of the acceleration of the vehicle, the drive torque, the operating state of the at least one permanent brake and a difference between a target distance from the vehicle to the vehicle ahead and an actual distance from the vehicle to the vehicle ahead being greater than or less than a limit value and to adjust the at least one regulating parameter based thereon.

14. The device as claimed in claim 13, further comprising:
a fifth sensing device configured to determine a state of at least one wheel brake of the vehicle,
wherein the control unit is configured to analyze the state of the at least one wheel brake and the logic unit is configured to logically combine states of the at least one wheel brake being greater than or less than a limit value with states of the acceleration of the vehicle, the drive torque of the engine, the operating state of the at least one permanent brake and the difference between the target distance to the vehicle ahead and the actual distance to the vehicle ahead being greater than or less than corresponding limit values and to adjust the at least one regulating parameter based thereon.

15. The device as claimed in claim 12, wherein the device is a component of a motor vehicle.

16. The method as claimed in claim 9, wherein the at least one regulating parameter remains constant upon reaching the maximum value or the minimum value.

17. The method as claimed in claim 1, wherein the third state variable is a percentage load on the permanent brake.

18. The method as claimed in claim 17, wherein the at least one permanent brake of the vehicle is at least one of an engine brake, an engine brake with one or more of an exhaust throttle and constant choke, a flow brake, a hydrodynamic retarder, an eddy current brake, and an electromagnetic retarder.

19. The method as claimed in claim 1, further comprising determining a speed difference between the vehicle and the vehicle traveling ahead,
   wherein regulating the longitudinal dynamics of the vehicle is further based on the determined speed difference between the vehicle and the vehicle traveling ahead.

* * * * *